United States Patent [19]

Hirahara

[11] 4,353,930
[45] Oct. 12, 1982

[54] CALCIUM CHLORIDE INFILTRATION OF APPLES

[75] Inventor: Katsuji Hirahara, Santa Clara, Calif.
[73] Assignee: FMC Corporation, Chicago, Ill.
[21] Appl. No.: 279,896
[22] Filed: Jul. 2, 1981
[51] Int. Cl.³ .................... A23B 7/156; A23L 1/212
[52] U.S. Cl. .................................. 426/281; 426/321; 426/335; 426/419; 426/615
[58] Field of Search ............... 426/281, 321, 327, 335, 426/615, 654, 419, 524

[56] References Cited

U.S. PATENT DOCUMENTS 2,531,431 11/1950 Hills .................................... 426/321
3,623,893 11/1971 Mauge ............................... 426/281
3,754,938 8/1973 Ponting ........................... 426/615 X

FOREIGN PATENT DOCUMENTS 405619 5/1967 Australia ............................ 426/321

*Primary Examiner*—Arthur L. Corbin
*Attorney, Agent, or Firm*—Lloyd B. Guernsey; R. B. Megley

[57] ABSTRACT

A process for simultaneously preparing both open-core and closed-core apples for cold storage includes subjecting a batch of such apples in a sealed chamber to a treatment in a pressurized bath of $CaCl_2$ solution and selectively reducing and increasing the pressure of the atmosphere in the chamber to effect penetration of the solution in desired quantities into both types of apples.

4 Claims, 1 Drawing Figure

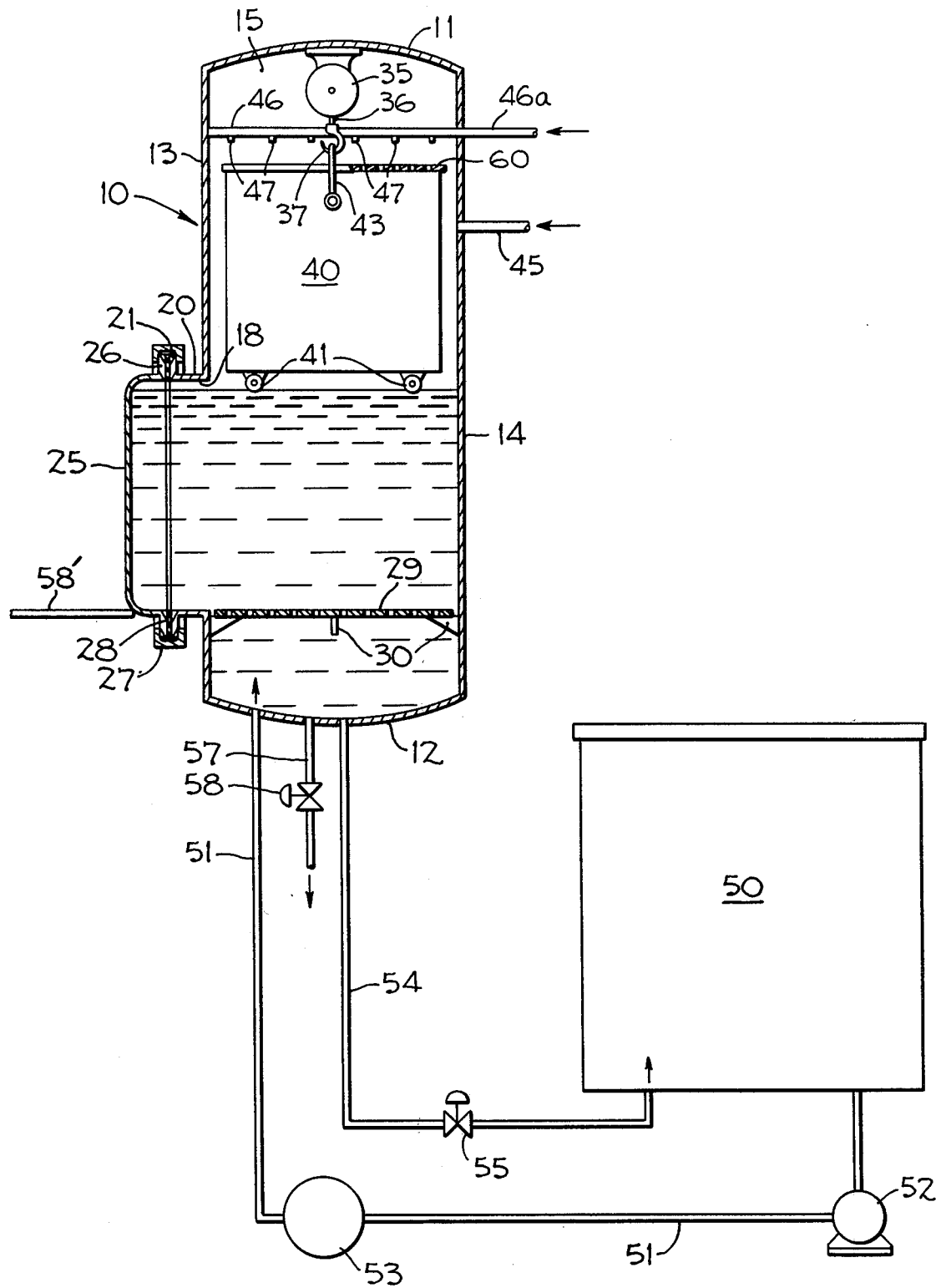

CALCIUM CHLORIDE INFILTRATION OF APPLES

BACKGROUND OF THE INVENTION

A large part of the apple crop is put into cold storage for a predetermined interval before the apples are brought to market. It has been found that while the apples are in cold storage an undesirable condition develops that is known as bitter pit and is characterized by small brown spots or streaks appearing on the flesh of the apples. It is known that a high calcium level in the fruit, either natural or infiltrated, will minimize bitter pit. Accordingly, various methods have been used to raise the calcium level in apples. In one method, the orchard is sprayed with calcium chloride solution and this method results in a calcium level that is a little higher but still below the desired level. In another method, the apples are dipped in a calcium chloride solution immediately after harvest and are then put into cold storage. Very little infiltration takes place during the dipping but, during cold storage, unrinsed calcium chloride slowly diffuses through the skin and enters the flesh of the apples. This diffusion method, while necessarily slow, has provided some benefit and it is being actively used commercially at present. Since it is desirable to infiltrate the calcium as quickly as possible to avoid bitter pit formation, vacuum infiltration has been attempted. This procedure involves the immersing of the fruit in a 4% calcium chloride solution, pulling a vacuum to remove some of the fruit gases, and releasing the vacuum with the fruit immersed. This method does infiltrate the desired amount of calcium into apples that have closed calyxes. However, some varieties of apples have a needle-like opening extending from the calyx or blossom end of the apple to the core cavity. When this method is used and the vacuum is released, an excessive amount of solution is forced into the core cavity of the apple resulting in core damage and imparting a bitter calcium chloride taste to the apple. To overcome this problem it has been proposed to vacuumize the apples, spray the solution on the apples instead of immersing them in the solution, and then break the vacuum. It is claimed that this spray-vacuumizing procedure does result in a sufficient amount of calcium being infiltrated into both open and closed core apples.

An object of the present invention is to provide an improved method of simultaneously infiltrating controlled amounts of calcium chloride in both open and closed core apples.

SUMMARY OF THE INVENTION

A process for infiltrating calcium chloride into open and closed-core apples comprises the initial step of pressurizing the apples for a short time to raise the internal pressure of the open-core apples but not affect the internal pressure of the closed-core apples, immersing the apples in a pressurized bath of calcium chloride solution to cause infiltration of the solution through the skin of the closed-core apples, reducing the pressure of the solution to reduce the internal pressure of the open-core apples a predetermined amount, and raising the pressure of the solution to cause a predetermined amount of penetration of the solution into the core cavity of the open-core apples.

DESCRIPTION OF THE DRAWING

The single drawing is a diagrammatic vertical section of apparatus for carrying out the process of the present invention.

DESCRIPTION OF THE PREFERRED EMBODIMENT

In the process of the present invention, open-core apples and closed-core apples are treated together in the following manner. A batch of apples, both open-core and closed-core types, is put into a closed tank, and the tank is pressurized with air for about 10 seconds. The internal pressure of the open-core apples becomes balanced with the outside pressure. However, 10 seconds is not a long enough treatment to effect the pressure of the closed-core apples and their internal pressure remains below the pressure in the tank. The apples are then immersed into a bath of calcium chloride which is in the tank and, accordingly, is pressurized. While the apples are immersed, the calcium chloride is forced into the closed-core apples through the skin since the internal pressure of the closed-core apples is below the pressure of the calcium chloride. No calcium chloride will be forced into the open-core apples since their internal pressure equals the pressure of the calcium chloride. After the apples have been immersed for a predetermined interval, the air pressure in the tank is reduced a predetermined amount. As a result, the pressure of the calcium chloride decreases and a controlled amount of gas is dissipated from the open colyx of the open-core apples as their internal pressure decreases. The pressure is then increased back to the first pressure. Accordingly, a controlled amount of calcium chloride is forced into the core cavity of the open-core apples. No penetration of the solution through the skin is permitted due to the substantially balanced pressure condition of the open-core apples. The closed-core apples are not effected by this decrease-increase operation.

At this point calcium chloride has been forced into the flesh of the fruit through the skin of the closed-core apples to the area in each apple immediately under the skin, and a desired quantity of calcium chloride has been deposited in the core cavity of the open-core apples. The air pressure in the tank is now released at a controlled rate until the pressure in the tank is atmospheric pressure. The calcium chloride solution is then drained from the tank, the apples are washed and dried, and are then ready for cold storage.

It is surmised that calcium chloride solution will diffuse uniformly through the apples during cold storage. In closed-core apples the diffusion will be from the flesh under the skin inwardly toward the core while in open-core apples the diffusion will be from the calyx core cavity toward the periphery of the apple.

A device for carrying out the process of the present invention is illustrated in the drawing and comprises a tank 10 having a top wall 11, a bottom wall 12, a front wall 13, a rear wall 14, and a pair of side walls 15 (one only being shown). An entrance opening 18 is formed in the front wall 13 by a short forwardly projecting four-side wall section 20 which has a flange 21 therearound. A door 25, that is adapted to close the opening 18, has a flange 26 arranged to be held in liquid-tight engagement with the flange 21 by a releasable clamp 27, a rubber gasket 28 being compressed between the flanges. A perforated platform 29 is supported across a lower area of the tank on inwardly projecting brackets 30 to form a continuation of the lower horizontal part of the wall section 20.

A power operated winch 35, which is mounted on the underside of the top wall 11 of the tank, has a cable 36 on which a hook 37 is secured. An open-top bin 40 is provided with four wheels 41 (two only being shown) secured to its bottom wall and an inverted U-shaped lifting bar 43 extending across the open top of the bin. The lifting bar has depending two leg members pivotally connected to opposite side walls of the bin.

A conduit 45, which is connected to a source of pressurized air, extends through an upper wall section of the tank, and a water heater 46 is mounted transversely across the upper end of the tank. The header has a plurality of downwardly directed spray heads 47 and an inlet section 46a extending through the wall of the tank for connection to a source of pressurized water. A storage tank 50 for calcium chloride solution is in flow communication with the tank 14 through a delivery conduit 51 in which a pump 52 and a micro filter 53 is installed, and through a return conduit 54 in which a flow control valve 55 is connected. A drain conduit 57, which has a flow control valve 58 therein, is connected to the bottom wall 12 of the tank adjacent conduits 51 and 54.

To process a batch of apples in the above-described apparatus, the apples are placed in the bin 40 when it is outside the tank and a heavy open grill 60 is placed on the bin to prevent apples from floating out of the bin during the subsequent immersion. At the start of the treatment, the calcium chloride is in the storage tank 50. The door 25 of the tank is removed, and the bin is wheeled along an approach platform 58' and moved into the tank through opening 18. The hook 37 of the winch is engaged with the lifting bar 43 of the bin and the winch is energized to raise the bin to the elevated position of the drawing. The door 25 is put back into place and sealed, and the pump 52 is energized to transfer calcium chloride from the storage tank to the processing tank 14. After the solution is in tank 14, the tank is pressurized by directing pressurized air into the tank through conduit 45 for about 10 seconds. As mentioned above, when the tank is pressurized the internal pressure of the open-core apples becomes balanced with the new elevated pressure in the tank but the internal pressure of the closed-core apples remains below the pressure in the tank and the pressure of the calcium chloride in the tank. The bin is then lowered into the calcium chloride solution, causing the solution to be forced through the skin of the closed-core apples into the flesh immediately under the skin but causing no penetration of the solution into the balanced-pressure, open-core apples. After a predetermined interval, the pressure in the tank is decreased slightly from the initial elevated pressure by venting the tank through conduit 45 to reduce the internal pressure of the open-core apples a predetermined degree. The pressure in the tank is again raised to its initial elevated pressure to force a desired quantity of $CaCl_2$ into the core cavity of the open-core apples. The pressure in the tank is then reduced to atmospheric pressure by releasing the pressure at a controlled rate through conduit 45. Valve 55 is then opened to permit the $CaCl_2$ solution to flow back to the storage tank 50. After all of the $CaCl_2$ solution is out of the tank 10, valve 55 is closed and water is forced into the tank through conduit 46a for application by nozzles 47 onto the apples in the bin 40 to wash $CaCl_2$ solution off the surfaces of the apples. After the washing operation, valve 58 is opened to drain the water from the tank. When the water has been drained, the valve 58 is closed, the door 25 is opened, and the bin 40 is disengaged from the hook 37 and rolled out of the tank. The apples are then dried in conventional drying apparatus and moved into a cold storage chamber.

A variation of the above method involves a change in the procedure after the apples have been immersed in the pressurized $CaCl_2$ and the penetration of $CaCl_2$ through the skin of closed-core apples has begun. At this point, instead of decreasing the pressure in the tank to reduce the internal pressure of the open-core apples and then raising the pressure again to force $CaCl_2$ into the core of these apples, the pressure in the chamber is raised slightly to cause a controlled volume of $CaCl_2$ to be forced into the core of these apples. After this procedure, the pressure in the chamber is lowered to atmospheric pressure, the $CaCl_2$ solution is drained from the chamber, and the apples are washed, dried and put into cold storage.

In carrying out the above-outlined apple-treating process, a 4% $CaCl_2$ solution at room temperature or cooler can be used in the processing tank 10, and the pressure to which the interior of the tank is initially raised can be 30 p.s.i.g. or less. The bin can be a typical open-top fruit servicing bin of the type that is generally cubical in configuration and measures about 40" on a side. The tank 10, the door 25 and the entrance opening are proportioned to accommodate such a bin.

From the foregoing description it will be apparent that the present invention provides a unique method of treating open-core and closed-core apples simultaneously to cause a desired amount of $CaCl_2$ solution to enter both types of apples so that the solution can be effectively dispersed throughout the apples during cold storage.

What is claimed is:

1. A method of treating a batch of apples, consisting of open and closed-core apples comprising the steps of positioning the batch of apples in a chamber at atmospheric pressure; sealing the chamber; moving a quantity of $CaCl_2$ solution into the chamber; raising the pressure of the atmosphere in the chamber to a predetermined level to pressurize the $CaCl_2$ solution; maintaining the pressure at said predetermined level for approximately 10 seconds with the apples in the pressurized atmosphere to raise the internal pressure of the open-core apples in the batch in the chamber; immersing all of the apples in the $CaCl_2$ solution to initiate inward movement of the solution toward the center of the closed-core apples in the batch; reducing the pressure in the chamber slightly to reduce the internal pressure of the open-core apples; returning the pressure of the chamber to said predetermined level to cause $CaCl_2$ solution to be moved into the openings at the core end of the open-core apples; lowering the pressure of the atmosphere in the chamber to atmospheric pressure; removing the $CaCl_2$ solution from the chamber; washing and drying all of said apples; and then placing all of the apples in a cold storage environment.

2. A process of treating a batch of apples, consisting of open and closed-core apples, in a sealed chamber comprising the steps of raising the pressure of a quantity of $CaCl_2$ solution in the chamber to a predetermined level, raising the internal pressure of the open-core apples in the batch to said predetermined level, immersing all the apples in the pressurized $CaCl_2$ solution to cause some of the solution to be forced into the closed-core apples in the batch, reducing the internal pressure of the open-core apples to a level below said predetermined level, and subjecting the open-core apples at said reduced pressure to the CaCl$_2$ solution that is at said predetermined pressure level to force CaCl$_2$ solution into the core end of the open-core apples.

3. A process for treating a batch of apples, that includes both open and closed-core apples, in a sealed chamber comprising the steps of forcing CaCl$_2$ solution through the skin of the closed-core apples in the batch to the area in each apple immediately under the skin, forcing a quantity of CaCl$_2$ solution the core cavity of the open-core apples in the batch, and subjecting the batch to a cold storage environment to cause diffusion of the CaCl$_2$ solution inwardly from the area under the skin of the closed-core apples and diffusion of the CaCl$_2$ solution outwardly in the open-core apples from the core cavity toward the periphery thereof.

4. A method of treating a batch of apples, including open and closed-core apples, comprising the steps of positioning the batch of apples in a chamber at atmospheric pressure; sealing the chamber; moving a quantity of CaCl$_2$ solution into the chamber; raising the pressure of the atmosphere in the chamber to a predetermined level to pressurize the CaCl$_2$ solution; maintaining the pressure at said predetermined level for approximately ten seconds with the apples in the pressurized atmosphere in the batch in the chamber; immersing the apples in the CaCl$_2$ solution to initiate inward movement of the solution toward the center of the closed-cored apples in the batch; increasing the pressure in the chamber slightly, with the apples immersed, to force a controlled volume of CaCl$_2$ solution into the openings at the core end of the open-core apples; lowering the pressure of the atmosphere in the chamber to atmospheric pressure; removing the CaCl$_2$ solution from the chamber; washing and drying all of said apples; and then placing all of the apples in a cold storage environment.

* * * * *